(12) United States Patent
Lin et al.

(10) Patent No.: US 7,611,412 B2
(45) Date of Patent: Nov. 3, 2009

(54) ORIENTATION DEVICE AND METHOD FOR COORDINATE GENERATION EMPLOYED THEREBY

(75) Inventors: Chih-Hsin Lin, Hsinchu Hsien (TW); Tzu-Yi Chao, Hsinchu Hsien (TW); Hsin-Chia Chen, Hsinchu Hsien (TW)

(73) Assignee: Pixart Imaging Inc., Hsin-Chu Hsien (TW)

(*) Notice: Subject to any disclaimer, the term of this patent is extended or adjusted under 35 U.S.C. 154(b) by 0 days.

(21) Appl. No.: 12/008,596

(22) Filed: Jan. 11, 2008

(65) Prior Publication Data

US 2008/0113799 A1   May 15, 2008

Related U.S. Application Data

(63) Continuation-in-part of application No. 11/392,089, filed on Mar. 28, 2006.

(30) Foreign Application Priority Data

May 10, 2005  (TW)  .............................. 94115044 A

(51) Int. Cl.
*A63F 9/24* (2006.01)
*A63F 13/00* (2006.01)
*G06F 17/00* (2006.01)
*G06F 19/00* (2006.01)

(52) U.S. Cl. .............................. 463/37; 463/51; 463/52; 463/53; 463/54; 463/56; 463/57; 345/156; 345/157; 345/158

(58) Field of Classification Search ............. 463/51–57, 463/49, 59; 345/427, 419, 420
See application file for complete search history.

(56) References Cited

U.S. PATENT DOCUMENTS

| | | | | |
|---|---|---|---|---|
| 6,146,278 A | * | 11/2000 | Kobayashi | .................... 463/53 |
| 6,275,214 B1 | * | 8/2001 | Hansen | ........................ 345/158 |
| 2002/0036617 A1 | * | 3/2002 | Pryor | ........................... 345/156 |

* cited by examiner

*Primary Examiner*—Dmitry Suhol
*Assistant Examiner*—Reginald A Renwick
(74) *Attorney, Agent, or Firm*—Tung & Associates

(57) ABSTRACT

A method for coordinate generation to be implemented using an orientation device includes the steps of: providing at least three reference marks on a target; aiming the orientation device at a target point on the target, and operating the orientation device such that the orientation device is able to capture an image of the target that contains the reference marks; assigning absolute coordinates to the reference marks in the image captured by the orientation device; and determining relative coordinates of the target point in a coordinate space of the target with reference to the absolute coordinates assigned to the reference marks. An orientation device that performs the method is also disclosed.

3 Claims, 12 Drawing Sheets

ORIENTATION DEVICE AND METHOD FOR COORDINATE GENERATION EMPLOYED THEREBY

CROSS-REFERENCES TO RELATED APPLICATIONS

This application is a continuation-in-part of co-pending U.S. patent application Ser. No. 11/392,089, filed on Mar. 28, 2006, which claims priority to Taiwanese Application No. 094115044, filed May 10, 2005, the disclosures of which are herein incorporated by reference.

BACKGROUND OF THE INVENTION

1. Field of the Invention

This invention relates to a method for coordinate generation and to an orientation device that generates coordinates of target points using the method.

2. Description of the Related Art

FIG. 1 illustrates a conventional light gun 8 for a video game system 9. The conventional light gun 8 includes an image sensor 82 and a timer 81. The video game system 9 further includes a display 91 and a game controller 92. The display 91 includes a cathode-ray tube screen 910 that presents images through interlace scanning. The game controller 92 is installed with gaming software. The light gun 8 is connected electrically and transmits coordinate signals to the game controller 92, which then responds by controlling progress of the game, including presentation of images on the screen 910 of the display 91.

The conventional method for coordinate generation using the aforementioned conventional light gun 8 includes the following steps:

a) aiming the light gun 8 at a target point 911 on the screen 910 of the display 91, and operating the light gun 8 such that the image sensor 82 is able to capture an aimed part of the image presented on the screen 910 of the display 91 and such that the timer 81 is able to determine the scanning time at which the target point 911 is scanned with reference to the presentation of the image on the screen 910 of the display 91; and b) determining the coordinates of the target point 911 with reference to the scanning time determined in step a).

The aforementioned method is disadvantageous since it is applicable only for displays that employ interlace scanning technique.

SUMMARY OF THE INVENTION

Therefore, the object of the present invention is to provide a method for coordinate generation, which is applicable for targets that use and do not use interlace scanning.

Another object of the present invention is to provide an orientation device which generates coordinates of target points and which is suitable for targets that use and do not use interlace scanning.

According to one aspect of the present invention, a method for coordinate generation is implemented using an orientation device that is provided with a sensor, and comprises the steps of:

A) providing at least three reference marks on a target;

B) aiming the orientation device at a target point on the target, and operating the orientation device such that the sensor is able to capture an image of the target that contains the reference marks;

C) assigning absolute coordinates to the reference marks in the image captured in step B); and D) determining relative coordinates of the target point in a coordinate space of the target with reference to the absolute coordinates of the reference marks assigned in step C).

According to another aspect of the present invention, a system comprises a target, at least three reference marks, and an orientation device. The target defines a coordinate space. The reference marks are provided on the target. The orientation device defines a coordinate space correlated with the coordinate space of the target, and includes a sensor and a processor. The sensor is able to capture an image of the target that contains the reference marks when the orientation device is operated while aiming at a target point on the target. The processor is coupled to the sensor, and is operable so as to compute absolute coordinates of the reference marks in the image captured by the sensor and so as to determine relative coordinates of the target point in the coordinate space of the target with reference to the absolute coordinates of the reference marks.

According to yet another aspect of the present invention, there is provided an orientation device for a system, which includes a target provided with at least three reference marks. The orientation device defines a coordinate space correlated with a coordinate space of the target, and comprises a sensor and a processor. The sensor is adapted to capture an image of the target that contains the reference marks when the orientation device is operated while aiming at a target point on the target. The processor is coupled to the sensor, and is operable so as to compute absolute coordinates of the reference marks in the image captured by the sensor and so as to determine relative coordinates of the target point in the coordinate space of the target with reference to the absolute coordinates of the reference marks.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
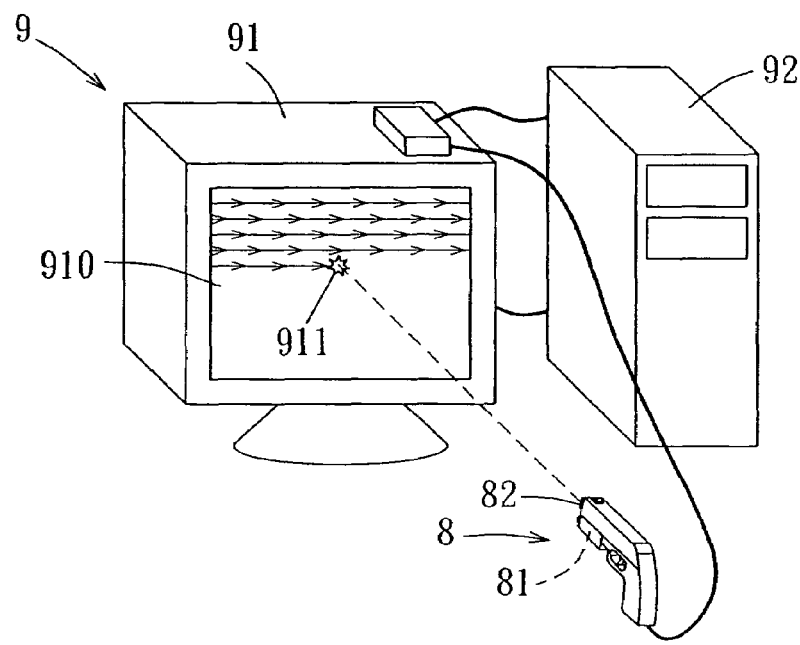
FIG. 1 is a perspective view of a conventional video game system.
Figure 2:
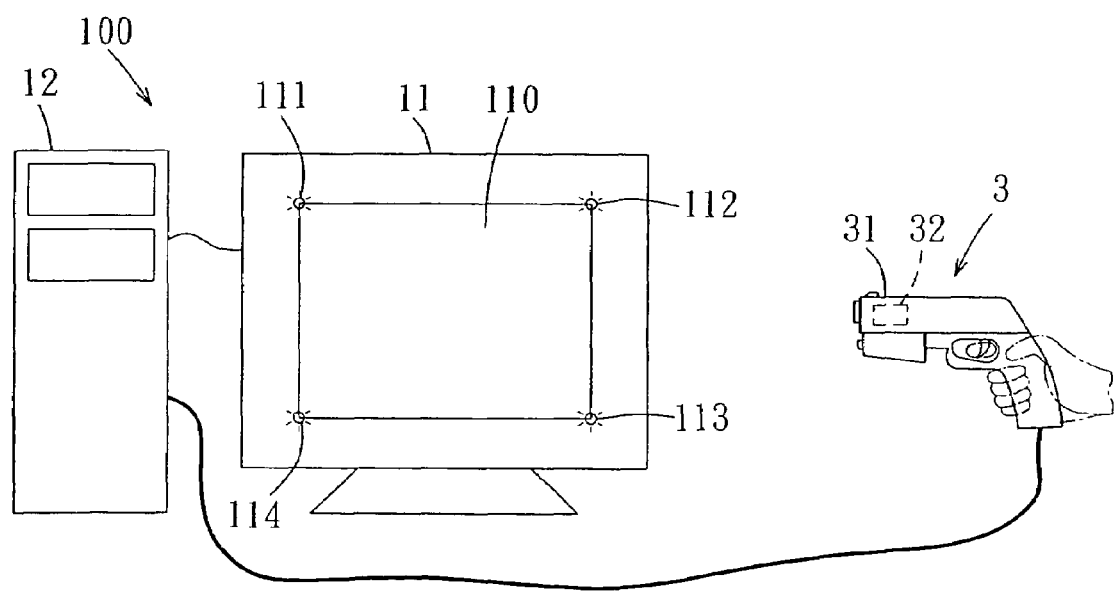
FIG. 2 is a schematic view of a system that incorporates the preferred embodiment of an orientation device according to the present invention.
Figure 3:
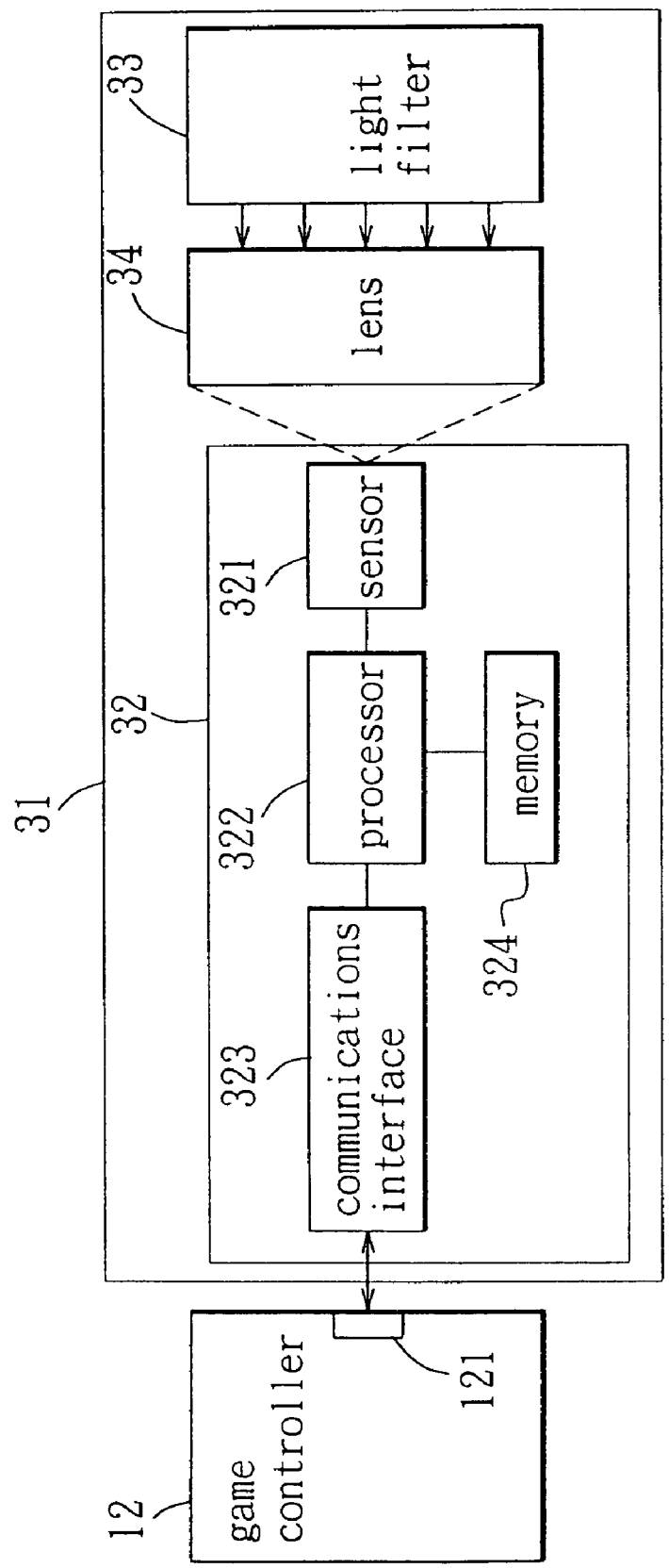
FIG. 3 is a schematic block diagram of the preferred embodiment.

Referring to FIGS. 2 and 3, the preferred embodiment of an orientation device 3 of a system 100 according to this invention is shown to include a controller module 32, a light filter 33, a lens 34, and a casing 31.

The system 100 further includes a target 11, four reference marks 111, 112, 113, 114, and a game controller 12.

The target 11, in this embodiment, is a display that includes a generally rectangular screen 110, which defines a coordinate space. Preferably, the display 11 may be a liquid crystal display (LCD), a plasma display panel (PDP) display, a cathode-ray tube (CRT) display, or a projector display. In an alternative embodiment, the target 11 may be a wall, a projector screen, or a ceiling.

The reference marks 111, 112, 113, 114 are provided on the screen 110 of the display 11. In this embodiment, each of the reference marks 111, 112, 113, 114 is a light source. Preferably, each of the reference marks 111, 112, 113, 114 is a light-emitting diode. In an alternative embodiment, each of the reference marks 111, 112, 113, 114 may be a reflector or a colored pattern.

Although the system 100 of this invention is exemplified using four of the reference marks 111, 112, 113, 114, it should be noted that the number of reference marks 111, 112, 113, 114 may be reduced to three.

The game controller 12 is installed with gaming software in a manner well known in the art, is coupled to the screen 110 of the display 11 and the orientation device 3, and includes a communications interface 121. In this embodiment, the communications interface 121 of the game controller 12 is a serial communications interface. In an alternative embodiment, the communications interface 121 of the game controller 12 is a parallel communications interface.

The orientation device 3 of this embodiment is a light gun that defines a coordinate space. In this embodiment, the orientation device 3 is operable so as to generate coordinates of a target point aimed thereby on the screen 110 of the display 11, in a manner that will be described hereinafter.

The controller module 32 of the orientation device 3 includes a sensor 321, a processor 322, a memory 324, and a communications interface 323.

The sensor 321 of the controller module 32 of the orientation device 3 is operable so as to capture an image of the screen 110 of the display 11 that contains the reference marks 111, 112, 113, 114 and so as to convert the captured image into a digitized image. In this embodiment, the sensor may be a complementary metal-oxide-semiconductor (CMOS) device or a charged-coupled device (CCD).

The processor 322 of the controller module 32 of the orientation device 3 is coupled to the sensor 321 of the controller module 32 of the orientation device 3, and is operable so as to receive and process the digitized image accordingly.

The memory 324 of the controller module 32 of the orientation device 3 is coupled to the processor 322 of the controller module 32 of the orientation device 3, and serves to temporarily store the digitized image processed by the processor 322.

The communications interface 323 of the controller module 32 of the orientation device 3 is coupled to the processor 322, and is connected electrically to the communications interface 121 of the game controller 12 for transmitting signals between the orientation device 3 and the game controller 12, in a manner well known in the art. In this embodiment, the communications interface 323 of the controller module 32 of the orientation device 3 is a serial communications interface. In an alternative embodiment, the communications interface 323 of the controller module 32 of the orientation device 3 is a parallel communications interface.

The light filter 33 of the orientation device 3 is disposed in front of the sensor 321 of the controller module 32 of the orientation device 3, and serves to filter undesired light spectrum.

The lens 34 of the orientation device 3 is disposed between the light filter 33 and the sensor 321.

The casing 31 of the orientation device 3 is in the shape of a gun, and houses the light filter 33, the lens 34, and the controller module 32.

Figure 4A:
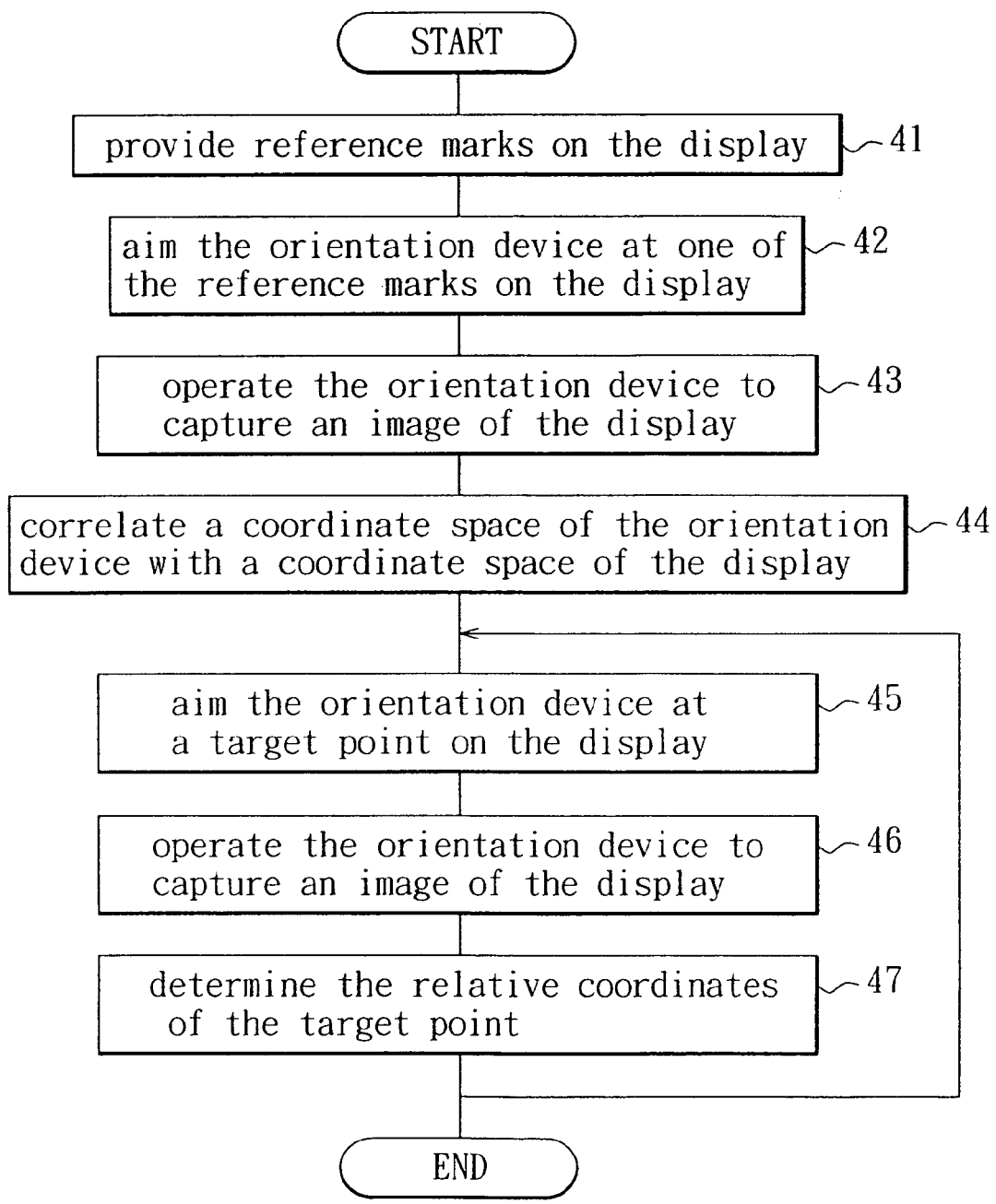
FIGS. 4A and 4B are flowcharts to illustrate the first preferred embodiment of a method for coordinate generation using an orientation device according to the present invention.

The first preferred embodiment of a method for coordinate generation to be implemented using the orientation device 3 of the system 100 according to this invention is described with further reference to FIG. 4A.

Figure 5:
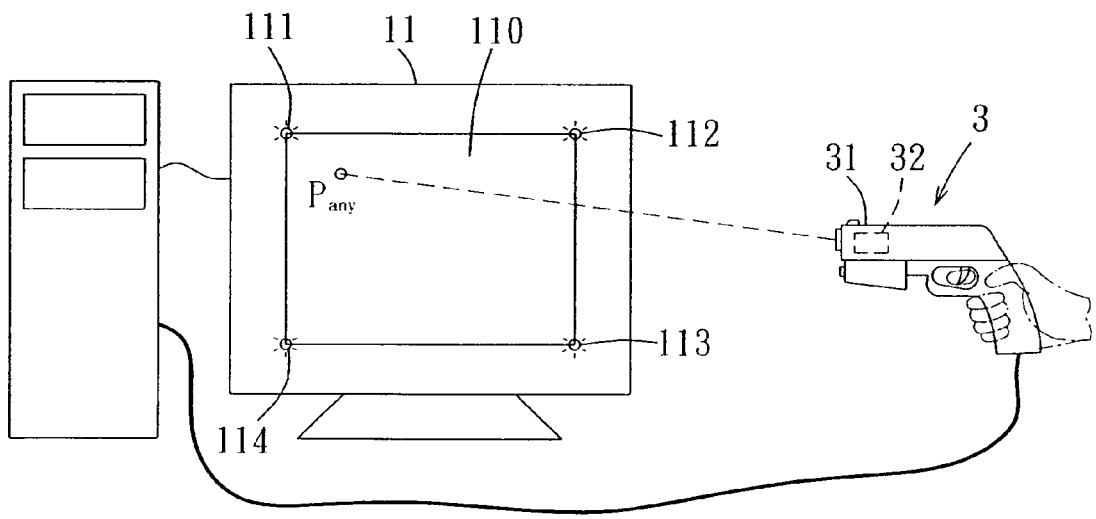
FIG. 5 illustrates a target point aimed by the orientation device.

In step 41, as illustrated in FIG. 5, each of the reference marks 111, 112, 113, 114 is provided on a respective one of the corners of the screen 110 of the display 11. That is, the coordinates of each of the reference marks 111, 112, 113, 114 are identical to those of the corners of the screen 110 of the display 11.

In step 42, the orientation device 3 is aimed at one of the reference marks 111, 112, 113, 114, such as the reference mark 111, on the screen 110 of the display 11.

In step 43, the orientation device 3 is operated such that the sensor 321 of the controller module 32 of the orientation device 3 is able to capture an image of the screen 110 of the display 11 that contains the reference mark 111 aimed in step 42.

In step 44, from the image captured in step 43, the processor 322 of the controller module 32 of the orientation device 3 correlates the coordinate space of the orientation device 3 with the coordinate space of the screen 110 of the display 11.

Figure 6:
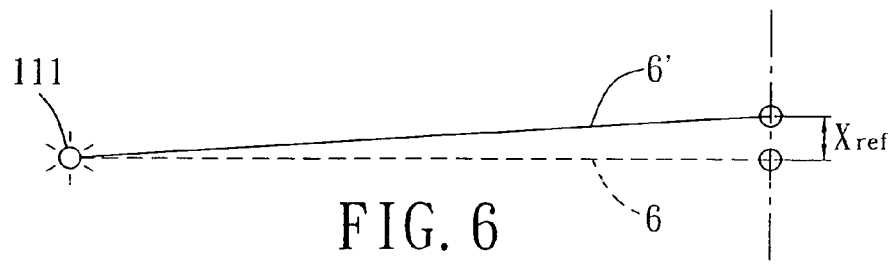
FIG. 6 illustrates an axis correction value determined by the orientation device.

It is noted that, in this step, the processor 322 of the controller module 32 of the orientation device 3 determines an axis correction value $(X_{ref})$ associated with mapping of the reference mark 111 onto the coordinate space of the orientation device 3, as illustrated in FIG. 6. In this embodiment, the axis correction value $(X_{ref})$ refers to an elevation angle formed by the orientation device 3 with an axis 6 of the reference mark 111 on the screen 110 of the display 11.

In step 45, the orientation device 3 is aimed at a target point $(P_{any})$ on the screen 110 of the display 11.

In step 46, the orientation device 3 is operated such that the sensor 321 of the controller module 32 of the orientation device 3 is able to capture an image of the screen 110 of the display 11 that contains the reference marks 111, 112, 113, 114.

In step 47, the processor 322 of the controller module 32 of the orientation device 3 determines the relative coordinates of the target point $(P_{any})$ with reference to the coordinate space relation established in step 44 and the image captured in step 46. Thereafter, the flow goes back to step 45.

Figure 4B:
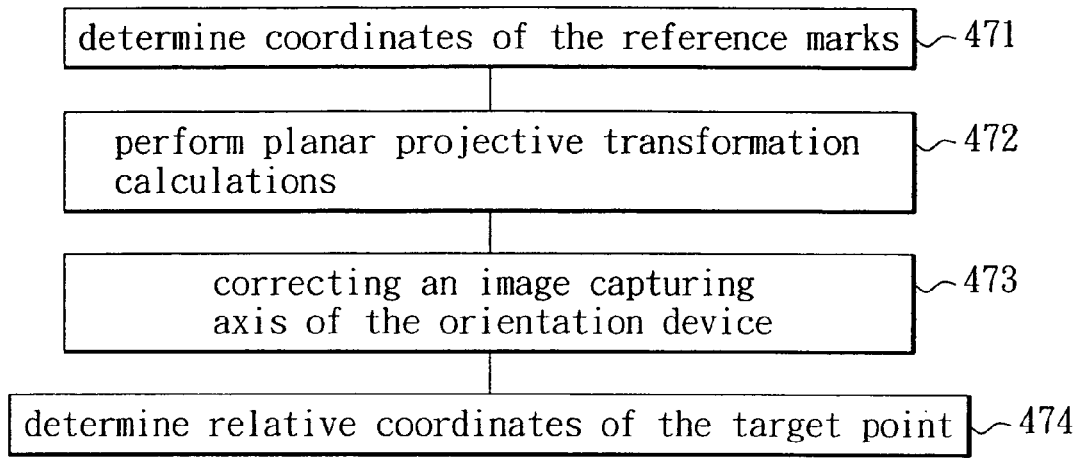

In this embodiment, with further reference to FIG. 4B, step 47 includes the sub-steps of:

sub-step 471: determining coordinates of the reference marks 111, 112, 113, 114 in the image captured in step 46;

sub-step 472: performing planar projective transformation calculations upon the coordinates of the reference marks 111, 112, 113, 114 determined in sub-step 471 to obtain a transformation matrix ($H_{any}$);

sub-step 473: correcting an image capturing axis 6' (see FIG. 6) of the sensor 321 of the controller module 32 of the orientation device 3 with reference to the transformation matrix ($H_{any}$) obtained in sub-step 472 and the axis correction value ($X_{ref}$) obtained in step 44; and sub-step 474: determining the relative coordinates of the target point ($P_{any}$) with reference to the corrected image capturing axis 6'.

It is noted that steps 41 to 44 are performed only to calibrate the orientation device 3. Once calibrated, steps 41 to 44 are skipped.

Figure 7A:
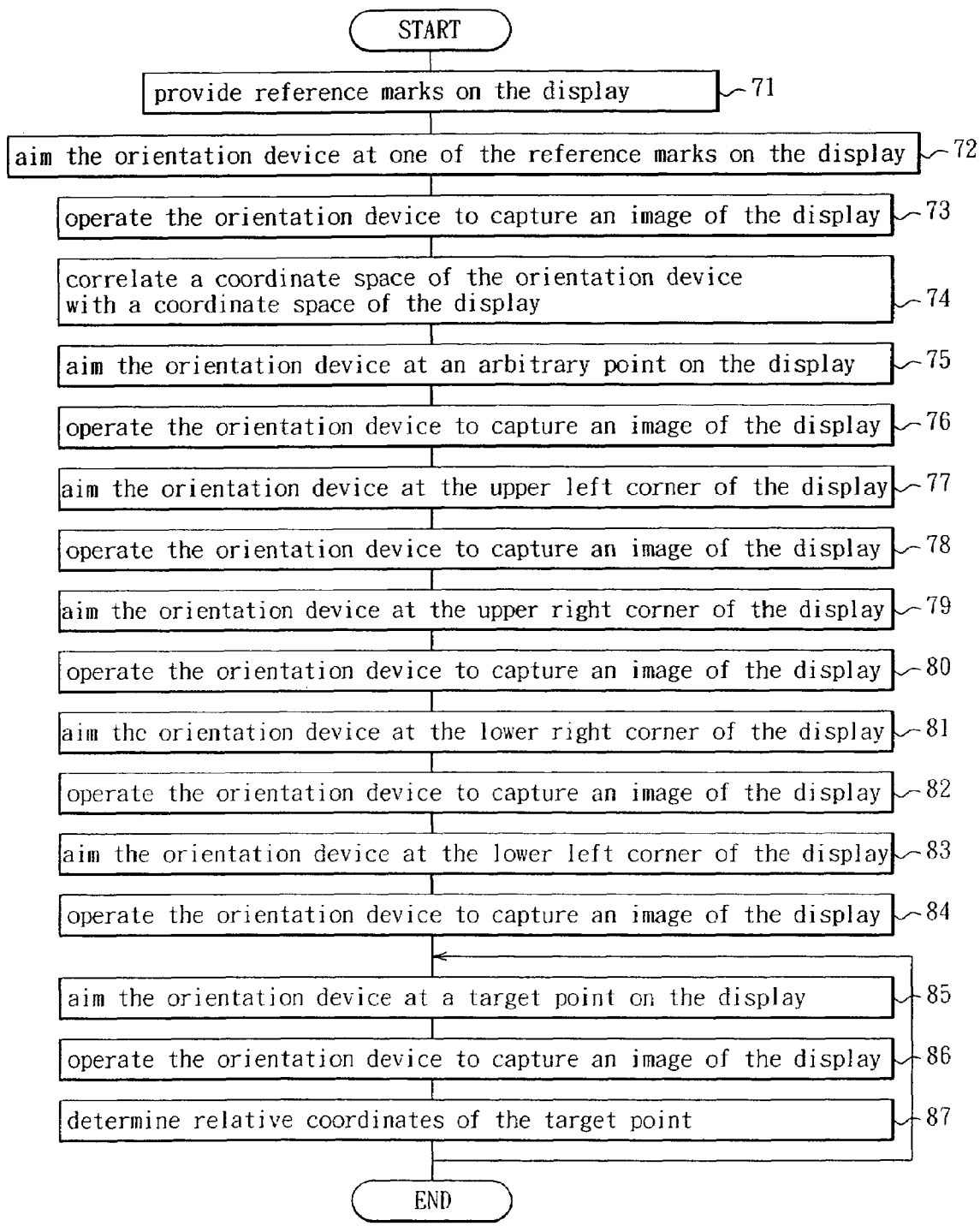
FIGS. 7A and 7B are flowcharts to illustrate the second preferred embodiment of a method for coordinate generation using an orientation device according to the present invention.

The second preferred embodiment of a method for coordinate generation to be implemented using the orientation device 3 of the system 100 according to this invention will now be described with further reference to FIG. 7A.

Figure 8:
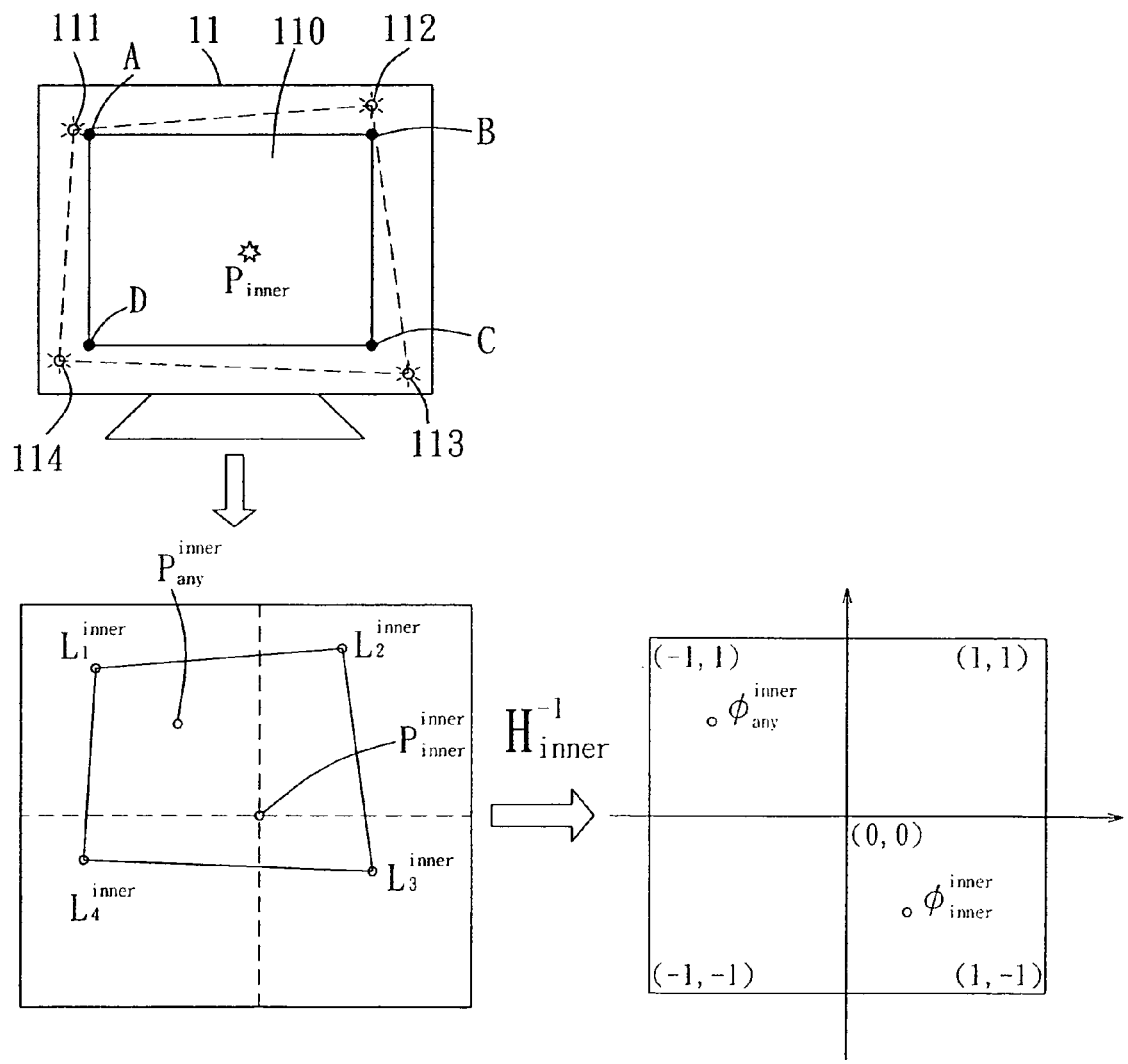
FIG. 8 illustrates a transformation matrix ($H_{inner}$) obtained by performing the second preferred embodiment of the method.

In step 71, as illustrated in FIG. 8, each of the reference marks 111, 112, 113, 114 is provided adjacent to a respective one of the corners (A, B, C, D) of the screen 110 of the display 11. That is, the coordinates of each of the reference marks 111, 112, 113, 114 are distinct from those of the respective adjacent corner (A, B, C, D) of the screen 110 of the display 11.

In step 72, the orientation device 3 is aimed at one of the reference marks 111, 112, 113, 114, such as the reference mark 111, on the screen 110 of the display 11.

In step 73, the orientation device 3 is operated such that the sensor 321 of the controller module 32 of the orientation device 3 is able to capture an image of the screen 110 of the display 11 that contains the reference mark 111 aimed in step 72.

In step 74, from the image captured in step 73, the processor 322 of the controller module 32 of the orientation device 3 correlates the coordinate space of the orientation device 3 with the coordinate space of the screen 110 of the display 11.

It is noted that, in this step, the processor 322 of the controller module 32 of the orientation device 3 determines an axis correction value ($X_{ref}$) associated with mapping of the reference mark 111 onto the coordinate space of the orientation device 3, as illustrated in FIG. 6.

In step 75, the orientation device 3 is aimed at an arbitrary point ($P_{inner}$) on the screen 110 of the display 11.

In step 76, the orientation device 3 is operated such that the sensor 321 of the controller module 32 of the orientation device 3 is able to capture an image of the screen 110 of the display 11 that contains the reference marks 111, 112, 113, 114.

In step 77, the orientation device 3 is aimed at the upper left corner (A) of the screen 110 of the display 11.

In step 78, the orientation device 3 is operated such that the sensor 321 of the controller module 32 of the orientation device 3 is able to capture an image of the screen 110 of the display 11 that contains the reference marks 111, 112, 113, 114.

In step 79, the orientation device 3 is aimed at the upper right corner (B) of the screen 110 of the display 11.

In step 80, the orientation device 3 is operated such that the sensor 321 of the controller module 32 of the orientation device 3 is able to capture an image of the screen 110 of the display 11 that contains the reference marks 111, 112, 113, 114.

In step 81, the orientation device 3 is aimed at the lower right corner (C) of the screen 110 of the display 11.

In step 82, the orientation device 3 is operated such that the sensor 321 of the controller module 32 of the orientation device 3 is able to capture an image of the screen 110 of the display 11 that contains the reference marks 111, 112, 113, 114.

In step 83, the orientation device 3 is aimed at the lower left corner (D) of the screen 110 of the display 11.

In step 84, the orientation device 3 is operated such that the sensor 321 of the controller module 32 of the orientation device 3 is able to capture an image of the screen 110 of the display 11 that contains the reference marks 111, 112, 113, 114.

Figure 9:
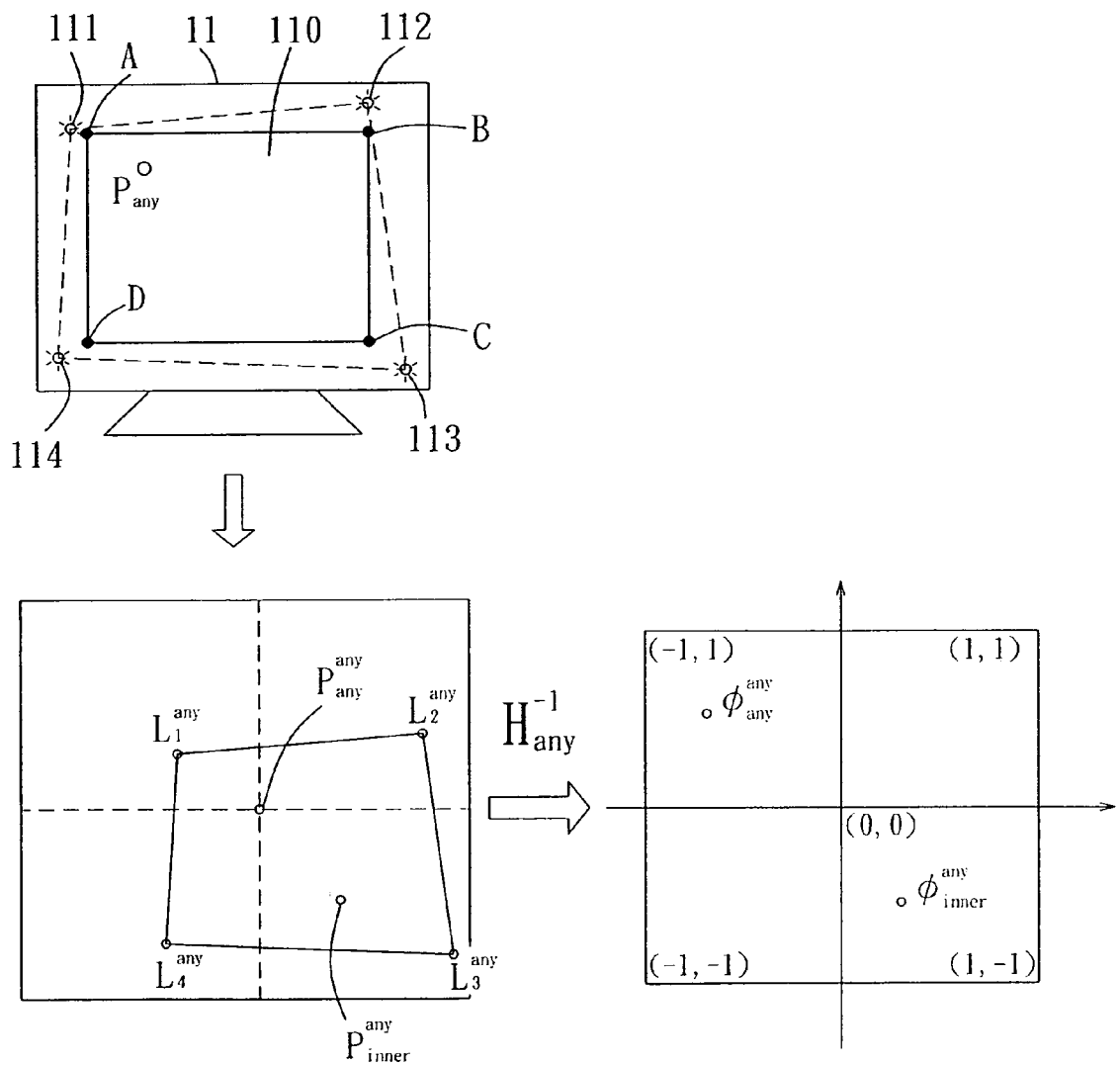
FIG. 9 illustrates a transformation matrix ($H_{any}$) obtained by performing the second preferred embodiment of the method.

In step 85, as illustrated in FIG. 9, the orientation device 3 is aimed at a target point ($P_{any}$) on the screen 110 of the display 11.

In step 86, the orientation device 3 is operated such that the sensor 321 of the controller module 32 of the orientation device 3 is able to capture an image of the screen 110 of the display 11 that contains the reference marks 111, 112, 113, 114.

In step 87, the processor 322 of the controller module 32 of the orientation device 3 determines the relative coordinates of the target point ($P_{any}$) with reference to the coordinate space relation established in step 74, and the images captured in steps 76, 78, 80, 82, 84 and 86. Thereafter, the flow goes back to step 85.

Figure 7B:
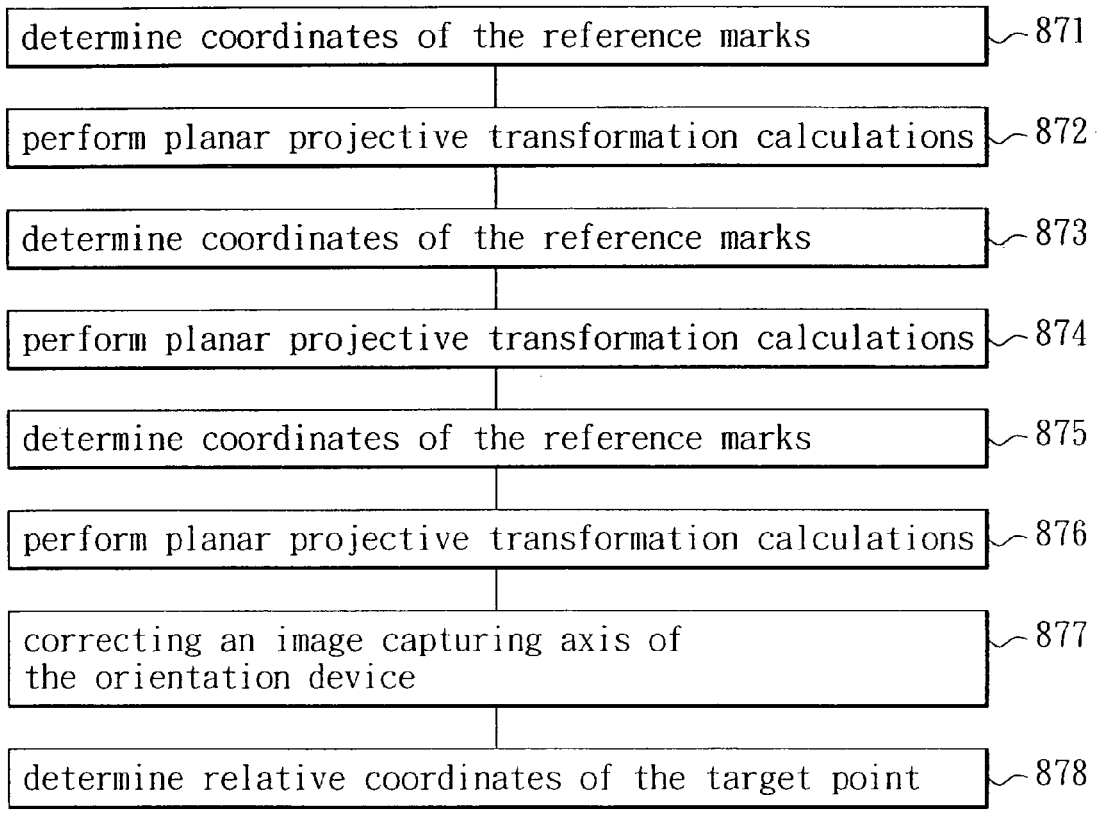

In this embodiment, with further reference to FIG. 7B, step 87 includes the sub-steps of:

sub-step 871: determining coordinates of the reference marks 111, 112, 113, 114 in the image captured in step 76;

sub-step 872: performing planar projective transformation calculations upon the coordinates of the reference marks determined in sub-step 871 to obtain a transformation matrix ($H_{inner}$), as illustrated in FIG. 8;

sub-step 873: determining coordinates of the reference marks 111, 112, 113, 114 in the images captured in steps 78, 80, 82, and 84;

sub-step 874: performing planar projective transformation calculations upon the coordinates of the reference marks 111, 112, 113, 114 determined in sub-step 873 to obtain transformation matrices ($H_a$, $H_b$, $H_c$, $H_d$);

sub-step 875: determining coordinates of the reference marks 111, 112, 113, 114 in the image captured in step 86;

sub-step 876: performing planar projective transformation calculations upon the coordinates of the reference marks 111, 112, 113, 114 determined in sub-step 875 to obtain a transformation matrix ($H_{any}$) as illustrated in FIG. 9;

sub-step 877: correcting an image-capturing axis 6' of the sensor 321 of the controller module 32 of the orientation device 3 with reference to the transformation matrix ($H_{inner}$) obtained in sub-step 872, the transformation matrices ($H_a$, $H_b$, $H_c$, $H_d$) obtained in sub-step 874, the transformation matrix ($H_{any}$) obtained in sub-step 876, and the axis correction value ($X_{ref}$) obtained in step 74; and sub-step 878: determining the relative coordinates of the target point ($P_{any}$) with reference to the corrected image capturing axis 6'.

It is noted that steps 71 to 84 are performed only to calibrate the orientation device 3. Once calibrated, steps 71 to 84 are skipped.

Figure 10A:
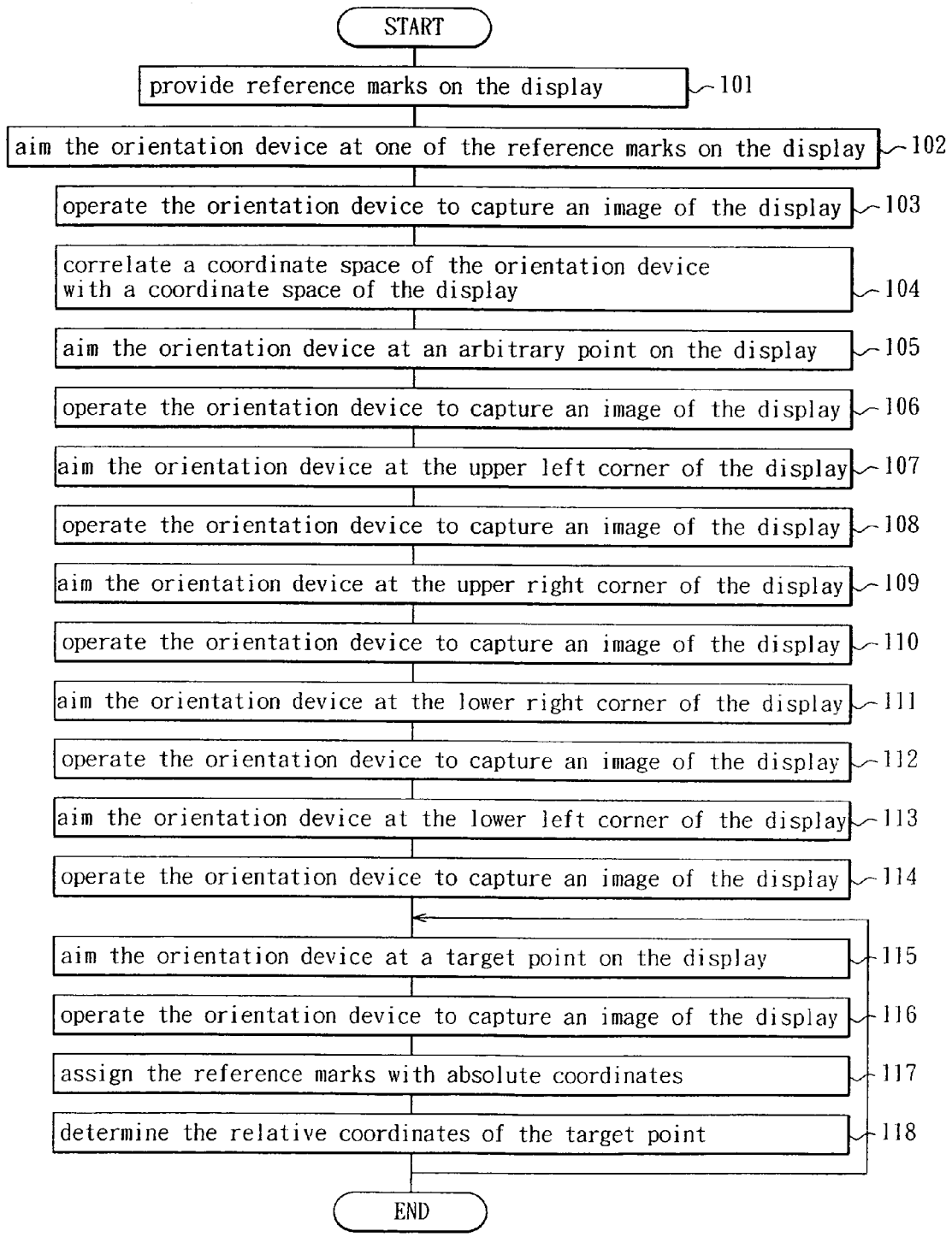
FIGS. 10A to 10C are flowcharts to illustrate the third preferred embodiment of a method for coordinate generation using an orientation device according to the present invention.

The third preferred embodiment of a method for coordinate generation to be implemented using the orientation device 3 of the system 100 according to this invention will now be described with further reference to FIG. 10A.

Figure 11:
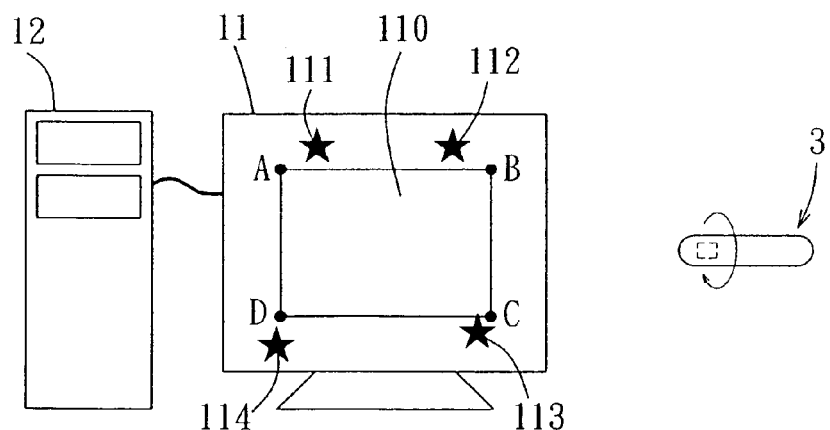
FIG. 11 is a schematic view to illustrate the orientation device aimed at a target and rotated about an image-capturing axis thereof.

In step 101, as illustrated in FIG. 11, each of the reference marks 111, 112, 113, 114 is provided adjacent to a respective one of the corners (A, B, C, D) of the screen 110 of the display 11. That is, the coordinates of each of the reference marks 111, 112, 113, 114 are distinct from those of the respective adjacent corner (A, B, C, D) of the screen 110 of the display 11.

In step 102, the orientation device 3 is aimed at one of the reference marks 111, 112, 113, 114, such as the reference mark 111, on the screen 110 of the display 11.

In step 103, the orientation device 3 is operated such that the sensor 321 of the controller module 32 of the orientation device 3 is able to capture an image of the screen 110 of the display 11 that contains the reference mark 111 aimed in step 102.

In step 104, from the image captured in step 103, the processor 322 of the controller module 32 of the orientation device 3 correlates the coordinate space of the orientation device 3 with the coordinate space of the screen 110 of the display 11.

It is noted that, in this step, the processor 322 of the controller module 32 of the orientation device 3 determines an axis correction value ($X_{ref}$) associated with mapping of the initial point 111 onto the coordinate space of the orientation device 3, as illustrated in FIG. 6.

In step 105, the orientation device 3 is aimed at an arbitrary point ($P_{inner}$) on the screen 110 of the display 11.

In step 106, the orientation device 3 is operated such that the sensor 321 of the controller module 32 of the orientation device 3 is able to capture an image of the screen 110 of the display 11 that contains the reference marks 111, 112, 113, 114.

In step 107, the orientation device 3 is aimed at the upper left corner (A) of the screen 110 of the display 11.

In step 108, the orientation device 3 is operated such that the sensor 321 of the controller module 32 of the orientation device 3 is able to capture an image of the screen 110 of the display 11 that contains the reference marks 111, 112, 113, 114.

In step 109, the orientation device 3 is aimed at the upper right corner (B) of the screen 110 of the display 11.

In step 110, the orientation device 3 is operated such that the sensor 321 of the controller module 32 of the orientation device 3 is able to capture an image of the screen 110 of the display 11 that contains the reference marks 111, 112, 113, 114.

In step 111, the orientation device 3 is aimed at the lower right corner (C) of the screen 110 of the display 11.

In step 112, the orientation device 3 is operated such that the sensor 321 of the controller module 32 of the orientation device 3 is able to capture an image of the screen 110 of the display 11 that contains the reference marks 111, 112, 113, 114.

In step 113, the orientation device 3 is aimed at the lower left corner (D) of the screen 110 of the display 11.

In step 114, the orientation device 3 is operated such that the sensor 321 of the controller module 32 of the orientation device 3 is able to capture an image of the screen 110 of the display 11 that contains the reference marks 111, 112, 113, 114.

Figure 12:
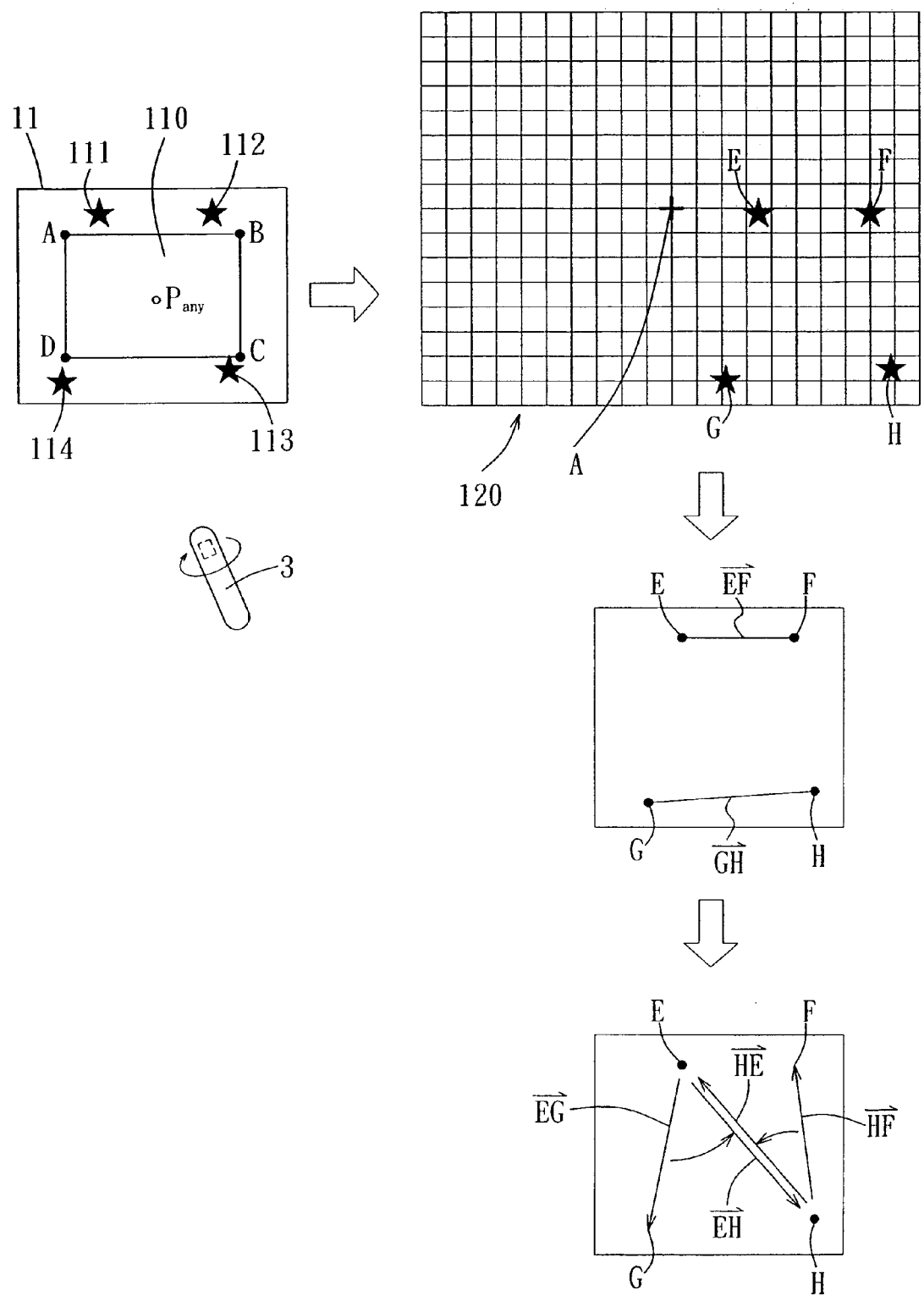
FIG. 12 is a schematic view to illustrate mapping of coordinates of reference marks into vectors.

In step 115, as illustrated in FIG. 12, the orientation device 3 is aimed at a target point ($P_{any}$) on the screen 110 of the display 11.

In step 116, the orientation device 3 is operated such that the sensor 321 of the controller module 32 of the orientation device 3 is able to capture an image of the screen 110 of the display 11 that contains the reference marks 111, 112, 113, 114.

In step 117, the reference marks 111, 112, 113, 114 are assigned with absolute coordinates in the image captured in step 116.

Figure 10B:
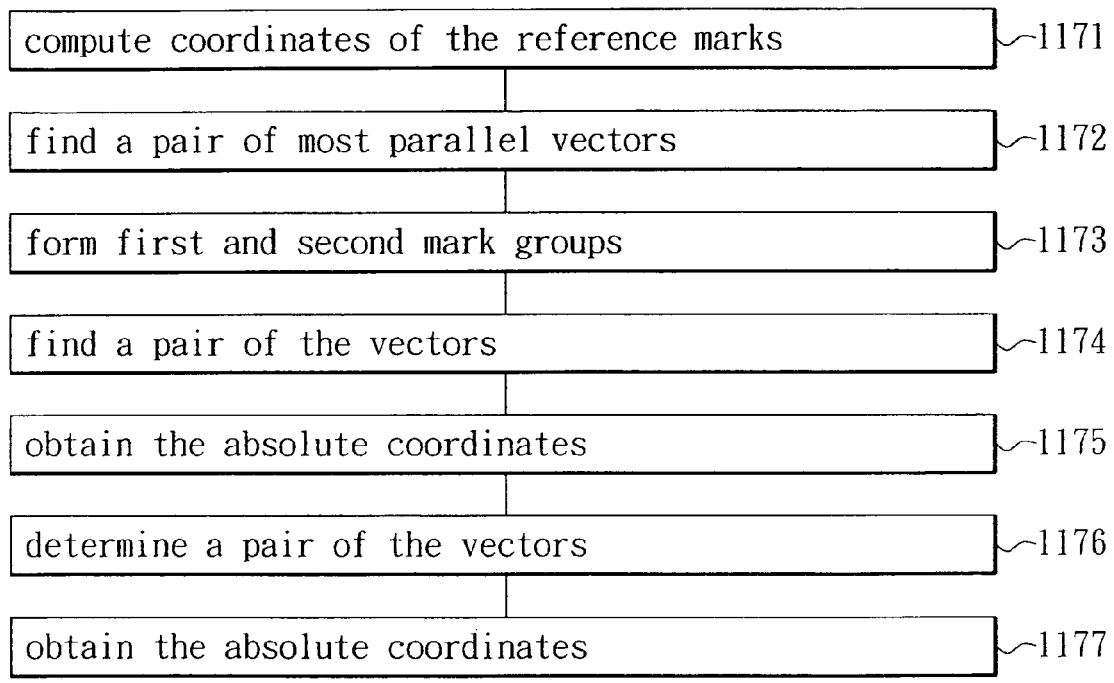

In this embodiment, with further reference to FIG. 10B, step 117 includes the sub-steps of:

sub-step 1171: computing coordinates of the reference marks 111, 112, 113, 114 in the image captured in step 116 to obtain vector combinations;

sub-step 1172: finding a pair of most parallel vectors, such as (EF) and (GH), from the vector combinations obtained in sub-step 1171;

It is noted that the pair of most parallel vectors has a largest absolute value of vector inner product compared to those of the other vector pairs (or vector combinations).

sub-step 1173: forming a first mark group from one of the vectors (EF), i.e., the shorter vector, found in sub-step 1172, and a second mark group from the other of the vectors (GH), i.e., the longer vector, found in sub-step 1172;

sub-step 1174: finding a pair of the vectors, such as (HF) and (HE), a vertex (H) of which is found in the second mark group, and endpoints (E, F) of which are found in the first mark group;

sub-step 1175: obtaining the absolute coordinates of the endpoints (E, F) in the first mark group based on a vector product of the vectors (HF, HE) found in sub-step 1174;

It is noted that, according to the right-hand rule, if the cross product of the vectors (HF, HE), i.e., (HF)×(HE), is greater than zero, or if the cross product of the vectors (HE, HF), i.e., (HE)×(HF), is less than zero, the endpoints (E, F) respectively correspond to the reference marks 111, 112.

sub-step 1176: determining a pair of the vectors, such as (EG) and (EH), a vertex (E) of which is found in the first mark group, and endpoints (G, H) of which are found in the second mark group; and sub-step 1177: obtaining the absolute coordinates of the endpoints (G, H) in the second mark group based on a vector product of the vectors (EG, EH) found in sub-step 1176.

It is noted that, according to the right-hand rule, if the cross product of the vectors (EG, EH), i.e., (EG)×(EH), is greater than zero, or if the cross product of the vectors (EH, EG), i.e., (EH)×(EG) is less than zero, the endpoints (G, H) respectively correspond to the reference marks 114, 113.

In step 118, the processor 322 of the controller module 32 of the orientation device 3 determines the relative coordinates of the target point ($P_{any}$) with reference to the coordinate space relation established in step 104, the images captured in steps 106, 108, 110, 112, 114 and 116, and the absolute coordinates of the reference marks 111, 112, 113, 114 assigned in step 117. Thereafter, the flow goes back to step 115.

Figure 10C:
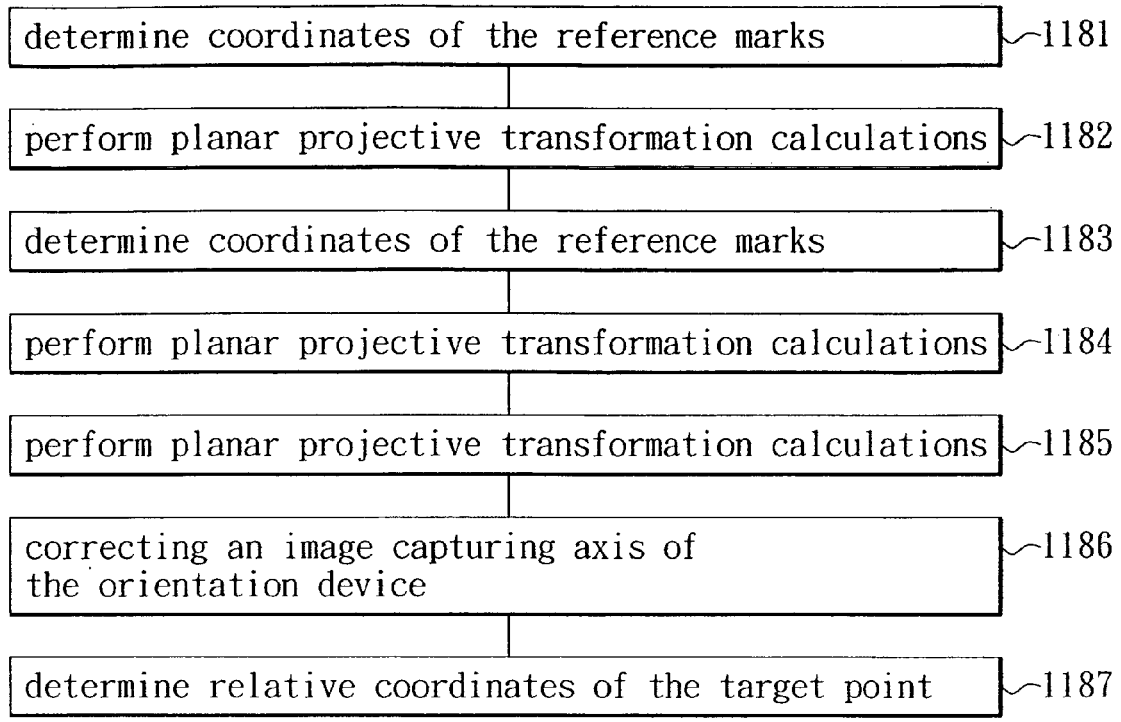

In this embodiment, with further reference to FIG. 10C, step 118 includes the sub-steps of:

sub-step 1181: determining coordinates of the reference marks 111, 112, 113, 114 in the image captured in step 106;

sub-step 1182: performing planar projective transformation calculations upon the coordinates of the reference marks 111, 112, 113, 114 determined in sub-step 1181 to obtain a transformation matrix ($H_{inner}$);

sub-step 1183: determining coordinates of the reference marks 111, 112, 113, 114 in the images captured in steps 108, 110, 112, and 114;

sub-step 1184: performing planar projective transformation calculations upon the coordinates of the reference marks

111, 112, 113, 114 determined in sub-step 1183 to obtain transformation matrices ($H_a$, $H_b$, $H_c$, $H_d$);

sub-step 1185: performing planar projective transformation calculations upon the absolute coordinates of the reference marks assigned in step 117 to obtain a transformation matrix ($H_{any}$);

sub-step 1186: correcting an image-capturing axis 6' of the sensor 321 of the controller module 32 of the orientation device 3 with reference to the transformation matrix ($H_{inner}$) obtained in sub-step 1182, the transformation matrices ($H_a$, $H_b$, $H_c$, $H_d$) obtained in sub-step 1184, the transformation matrix ($H_{any}$) obtained in sub-step 1185, and the axis correction value ($X_{ref}$) obtained in step 104; and sub-step 1187: determining the relative coordinates of the target point ($P_{any}$) with reference to the corrected image capturing axis 6'.

It is noted that steps 101 to 114 are performed only to calibrate the orientation device 3. Once calibrated, steps 101 to 114 are skipped. Furthermore, unlike in the previous embodiments, in this embodiment, the relative coordinates of the target point ($P_{any}$) are determined with reference to the absolute coordinates of the reference marks 111, 112, 113, 114 assigned in step 117. As such, the relative coordinates of the target point ($P_{any}$) can be accurately determined in step 118 even when the orientation device 3 is rotated about the image-capturing axis 6' in step 115.

It has thus been shown that, in the method and orientation device 3 of this invention, relative coordinates of target points are generated without referring to scanning information of images presented on the displays. The present invention is thus applicable to a wide variety of targets, including those displays that do not use interlace scanning.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for coordinate generation to be implemented using an orientation device that is provided with a sensor, said method comprising the steps of:
    A) providing at least four reference marks on a target;
    B) aiming the orientation device at a target point on the target, and operating the orientation device such that the sensor is able to capture an image of the target that contains the reference marks;
    C1) computing coordinates of the reference marks in the image captured in step B) to obtain vector combinations;
    C2) finding a pair of most parallel vectors from the vector combinations, and obtaining absolute coordinates of the reference marks projected onto the coordinate space of the target according to the pair of most parallel vectors; and
    D) determining relative coordinates of the target point in a coordinate space of the target with reference to the absolute coordinates of the reference marks assigned in step C2);
    E) aiming the orientation device at an arbitrary point on the target; and
    F) operating the orientation device such that the sensor is able to capture an image of the target that contains the reference marks;

wherein step D) includes the sub-steps of:
    D1) determining coordinates of the reference marks from the image captured in step F);
    D2) performing projective transformation calculations upon the coordinates of the reference marks determined in sub-step D1) to obtain a transformation matrix;
    D3) correcting an image-capturing axis of the sensor of the orientation device with reference to the transformation matrix obtained in sub-step D2) and an established coordinate space relation between the target and the orientation device; and
    D4) determining the relative coordinates of the target point with reference to the corrected image-capturing axis.

2. The method as claimed in claim 1, further comprising the steps of:
    G) aiming the orientation device at one of the reference marks;
    H) operating the orientation device such that the sensor is able to capture an image of the target that contains the reference mark aimed in step G);
    I) determining the coordinates of the reference mark aimed in step G) from the image captured in step H); and
    J) correlating a coordinate space of the orientation device with a coordinate space of the target to thereby establish the coordinate space relation.

3. A method for coordinate generation to be implemented using an orientation device that is provided with a sensor, said method comprising the steps of:
    A) providing at least four reference marks on a target;
    B) aiming the orientation device at a target point on the target, and operating the orientation device such that the sensor is able to capture an image of the target that contains the reference marks;
    C1) computing coordinates of the reference marks in the image captured in step B) to obtain vector combinations;
    C2) finding a pair of most parallel vectors from the vector combinations, and obtaining absolute coordinates of the reference marks projected onto the coordinate space of the target according to the pair of most parallel vectors; and
    D) determining relative coordinates of the target point in a coordinate space of the target with reference to the absolute coordinates of the reference marks assigned in step, C2);
    E) aiming the orientation device at one corner of the target, and operating the orientation device such that the sensor is able to capture an image of the target that contains the reference marks;

wherein step D) includes the sub-steps of:
    D1) determining coordinates of the reference marks from the image captured in step E);
    D2) performing projective transformation calculations upon the coordinates of the reference marks determined in sub-step D1) to obtain a transformation matrix;
    D3) correcting an image-capturing axis of the sensor of the orientation device with reference to the transformation matrix obtained in sub-step D2); and
    D4) determining the relative coordinates of the target point with reference to the corrected image-capturing axis.

* * * * *